United States Patent [19]

Bellar et al.

[11] 4,418,996

[45] Dec. 6, 1983

[54] COLOR BEAM PROJECTOR APPARATUS

[75] Inventors: Dennis Bellar; Thurman Sasser, both of Orlando, Fla.

[73] Assignee: Laser Photonics, Inc., Orlando, Fla.

[21] Appl. No.: 426,722

[22] Filed: Sep. 29, 1982

[51] Int. Cl.³ .............................................. G03B 21/28

[52] U.S. Cl. ...................................... 353/33; 353/101; 353/81

[58] Field of Search ................. 353/1, 31, 33, 81, 101, 353/82; 350/168, 170, 6.3; 362/339, 293, 2

[56] References Cited

U.S. PATENT DOCUMENTS

| | | | |
|---|---|---|---|
| 642,993 | 2/1900 | DeMare | 353/81 X |
| 2,493,238 | 1/1950 | Eddy | 353/1 |
| 3,549,258 | 12/1970 | Henderson | 350/168 X |
| 3,575,499 | 4/1971 | Mahoney, Jr. | 353/98 X |
| 3,609,339 | 9/1971 | Smith et al. | 353/1 X |
| 3,883,737 | 5/1975 | Throssell et al. | 350/6.3 X |
| 4,012,147 | 3/1977 | Walrafen | 350/168 X |

FOREIGN PATENT DOCUMENTS

| | | | |
|---|---|---|---|
| 789007 | 8/1935 | France | 353/81 |

*Primary Examiner*—Harry N. Haroian
*Attorney, Agent, or Firm*—William M. Hobby, III

[57] ABSTRACT

An apparatus for generating and projecting a bright, narrow, color selectable beam of light has a light source for producing a beam of light directed into a collimating lens and from the collimating lens into a prism. The prism disperses the light into a plurality of color components which are directed into a movable focusing lens for focusing the dispersed light into one of a plurality of positions onto an aperture to thereby select one or more color components of light through the aperture responsive to the positioning of the focusing lens. The focusing lens is moved responsive to an electric motor, which moves responsive to a voltage signal. The selected color component may be further collimated and directed against a series of movable mirrors for generating a variety of scanned patterns of colored light onto a flat surface. The moving spot of light will appear as patterns due to the persistence of the eye which blends the fast moving spot into long continuous lines.

14 Claims, 5 Drawing Figures

COLOR BEAM PROJECTOR APPARATUS

BACKGROUND OF THE INVENTION

The present invention relates to an apparatus for generating and projecting a bright, narrow color selectable beam of light for the generation of projected images.

In the past, a wide variety of devices have been utilized to generate a color beam of light by dispersing white light with a prism or by defraction grating. Such dispersions are commonly used in spectrometers and are less often used in generating projected images, such as words or objects, for producing artistic effects and for stage lighting and other applications requiring an intense narrow beam of white or colored light. It is much more common to utilize a beam of light through a colored filter for generating a colored light beam for these requirements and the colors may be changed by changing the filters and may be continuously varied by rotating filters in front of the light beam.

Typical prior patents which separate light into color components for various reasons can be seen in U.S. Pat. No. 3,659,918 for a color separating prism system and in U.S. Pat. No. 4,003,634 for an optical control assembly for a color design viewer which uses a single source of white light for five independent channels, each of which divides the light into three spectral components. In U.S. Pat. No. 3,907,430, an optical band pass filter uses a series of prisms and in U.S. Pat. No. 4,125,864 a beam splitter separates light into separate channels. U.S. Pat. No. 4,033,052 for an optical teaching aid is used for demonstrating the pure component of spectral colors of white light and the effect of selecting recombination of the spectral colors. It utilizes a diffraction grating to produce the spectrum from white light and then selectively filters the spectrum and then splits the light prior to recombination to project both an image of the selective filter and the new combined selectively filtered light adjacent to each other on a projection screen.

An aim of the present invention is to generate and project a bright, narrow color selectable beam of light which can be rapidly changed and which can produce a pattern of varying designs, as well as be connected for a rapid automatic control to produce constantly varying patterns, as desired.

SUMMARY OF THE INVENTION

A color beam projector apparatus is provided for generating and projecting a bright, narrow color selectable beam of light. The projector includes a light source for producing a beam of light and directing the beam of light into a collimating lens for collimating the light. Collimated light is directed into a prism at an angle to disperse the light into a plurality of spectral color components. The refracted light from the prism is impinged upon a movable focusing lens for focusing the dispersed light into a plurality of positions onto an aperture to thereby select one or more color components of light through said aperture responsive to the positioning of the focusing lens. The movable focusing lens can be connected to a motor actuated frame for moving the focusing lens to different positions responsive to a voltage signal. A rotating disc can have a plurality of apertures of different sizes or shapes thereon and can be selectively positioned in front of the fucusing lens to vary the selective color or colors from the focusing lens and a movable collimating lens can be positioned behind the movable disc having apertures therein for collimating the light, which may be directed to pattern generators, such as a plurality of movable mirrors for generating various designs.

BRIEF DESCRIPTION OF THE DRAWINGS

Other objects, features and advantages of the present invention will be apparent from the written description and the drawings, in which.

DESCRIPTION OF THE PREFERRED EMBODIMENTS

Figure 1:
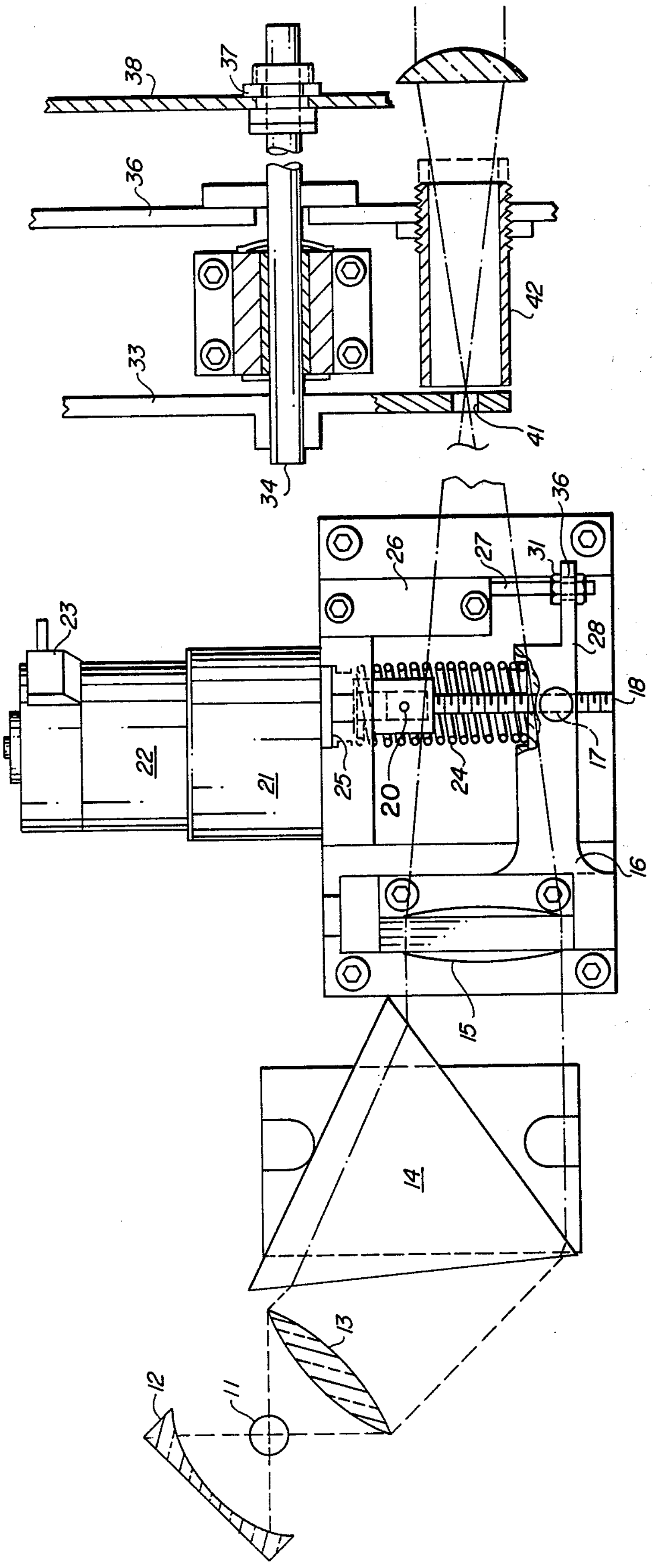
FIG. 1 is a top sectional and diagrammatic view of a color beam projector in accordance with the present invention.
Figure 2:
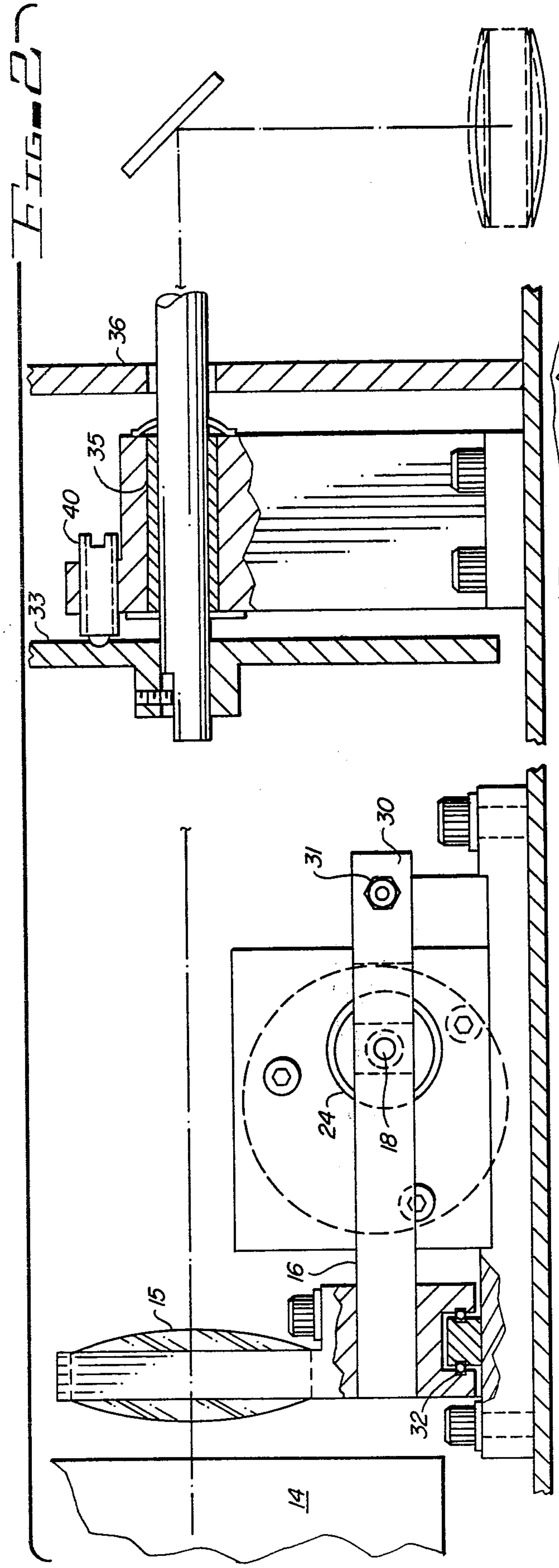
FIG. 2 is a side sectional view of a color beam projector in accordance with FIG. 1.

Referring to FIGS. 1 and 2 of the drawings, a color beam projecting apparatus 10 has a lamp 11 which would normally be mounted in a lamp housing having a concave mirror 12 mounted on one side and positioned to place the lamp 11 on the radius of curvature of the mirror for directing a beam of light, indicated by the dash lines, into a collimating lens 13 for collimating the light. The lens 13 is aimed at a prism 14 positioned at an angle as shown for dispersing of white light into spectral color components as they are refracted in the prism 14 and directed onto the lens 15 which is mounted on a lens carriage frame 16. The lens carriage frame 16 has a tapped aperture 17 passing through an arm thereof and a threaded pin 18 connected through the threaded aperture 17. The threaded shaft 18 is connected with a coupling 20 through a gear reduction box 21 and to servo motor 22, which varies the position of the frame 16 and lens 15 by the rotation of the drive shaft 18. A coil spring 24 is positioned around the shaft 18 between the frame 16 and a spring support 25 on the coupling 20. A linear servo feedback potentiometer 26 has a sliding control arm 27 connected to an arm 28 of the frame 16 through an aperture 36 with nuts 31. The frame 16 can be seen riding on a ball slide 32 directly below the lens 15. Thus, the lens 15 is moved responsive to the servo motor 22 driving the shaft 18 to slide the frame 16 on the ball slide 32 to change the position of the lens 15. Simultaneously, the movement of the frame 16 moves the arm portion 28 to slide the slide control 27 in the linear potentiometer 26 to give a feedback signal and which can tell the position of the lens by the voltage feedback. The voltage feedback and the control voltage is compared by an electronic circuit (not shown) for varying the position of the frame 16 if desired. This advantageously allows the lens 15 to be varied in accordance with other controls such as computer controls as desired, without departing from the spirit and scope of the invention.

The lens 15 focuses the dispersed beam of light onto a rotatable metal disc 33 attached to a shaft 34 riding in a bushing 35 passing through the housing wall 36 and to a bushing 37 connected to the housing wall 38. A ball detent 40 is mounted to one side of the bushing 35 and acts with latch positions on the rotatable disc 33 to position the rotatable disc in preset conditions to align one of a series of apertures 42 through the disc 33 in front of the lens 15. Thus, movement of the lens varies the focus onto the disc 33 and allows a predetermined portion of the dispersed spectral colors to pass through the aperture 41 and into a light shield 42 and through the housing 36. The light passing through the aperture can be of one selected color or two apertures will give two colors simultaneously if desired. The light passing through the light shield 42 is impinged upon a 45 degree mirror 43 which directs the light through a collimating lens 44, which is mounted so that it can be varied in position, thereby to focus the light for different distances as desired.

Figure 4:
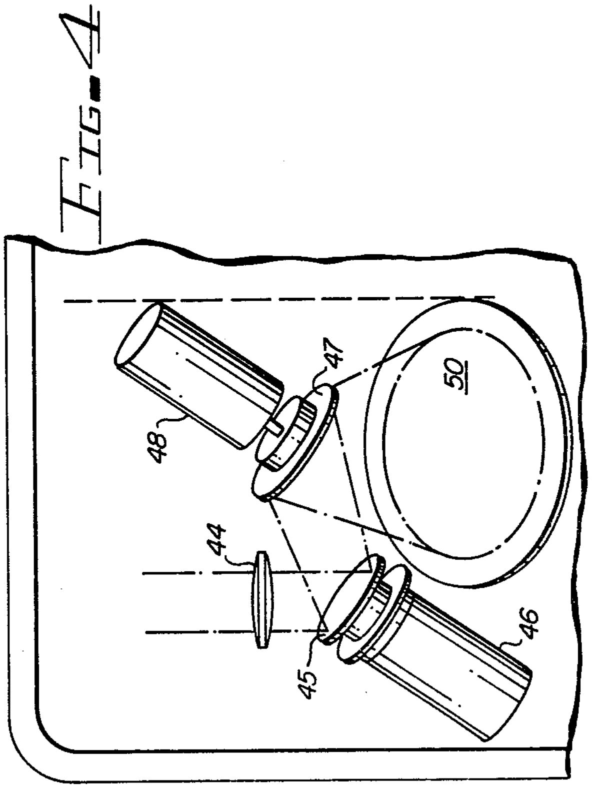
FIG. 4 is a perspective view of a pattern generator of FIG. 3.
Figure 3:
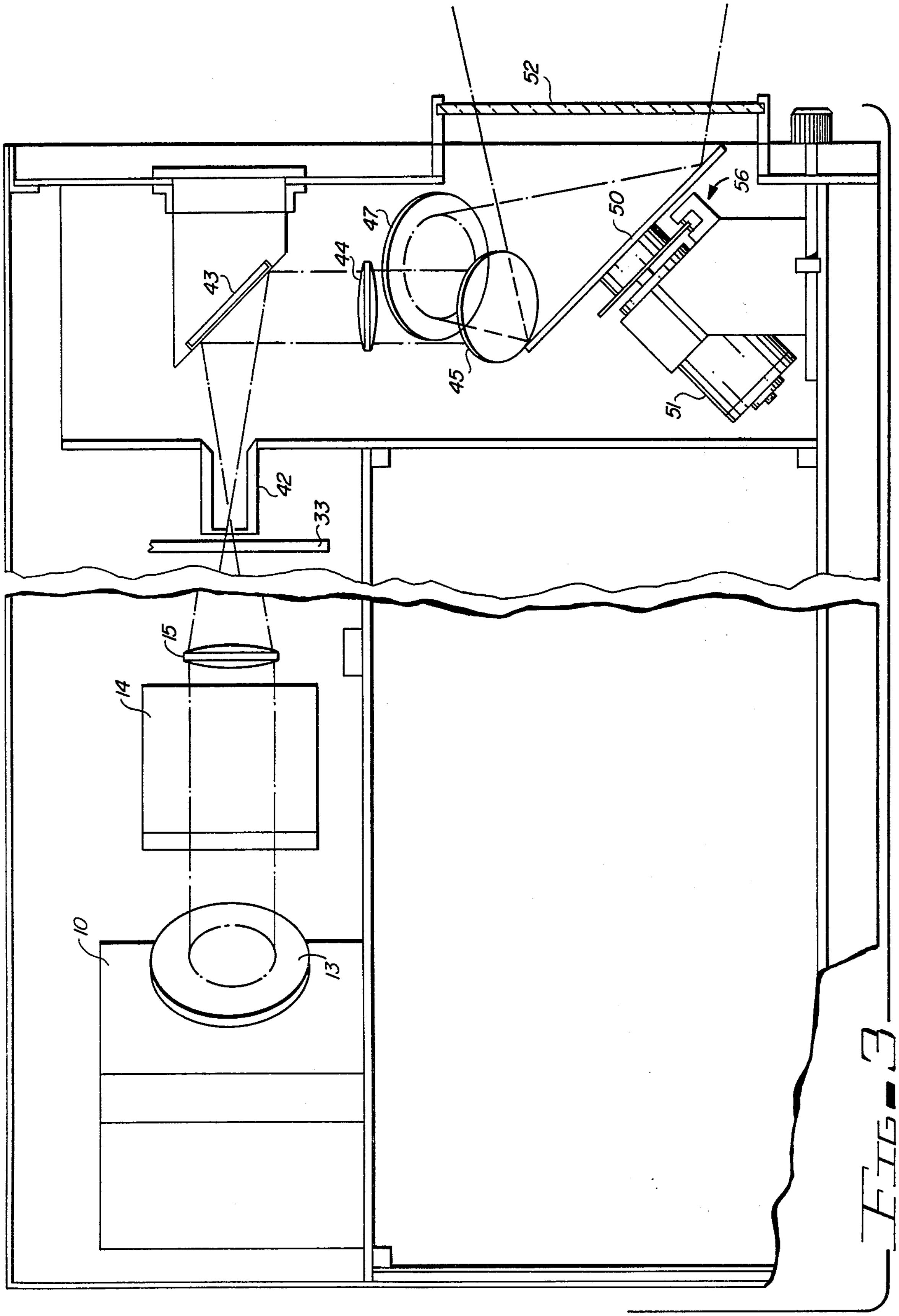
FIG. 3 is a side elevation of a color beam projector in accordance with FIGS. 1 and 2 having a beam pattern generator mounted therein.

The recollimating lens 44, as can be seen in FIGS. 3 and 4, directs the light against a first rotating mirror 45 rotated by electric motor 46, which directs the beam of light to a second rotating mirror 47 rotated by second electric motor 48 which in turn directs the beam of light against a third rotating mirror 50 rotated by third electric motor 51 and out a window 52 in the housing, as more clearly shown in FIGS. 3 and 4. In FIG. 3 the light is generated in the lamp housing 10 and directed through the prism 14 into the focusing lens 15 and through the aperture selection wheel 33 through the light shield 42 and onto the 45 degree mirror 43; and from there into the recollimating lens 44 and onto the first rotating mirror 45. This particular series of three rotating mirrors allows the light source to generate an infinite number of spirographic patterns, such as a pair of circles, one inside the other, of selected colored light and can be varied to generate clover leaf or other patterns as desired. It will, of course, be clear that other pattern generators can be utilized and if the 45 degree mirror 43 is removed the light passing through the light shield 42 can also be directed to form lines against a surface and controlled to create letters or words without the use of the spirographic pattern generator as shown.

The advantage of the color beam generator in accordance with the present invention is that it produces a bright, narrow, collimated, rapidly selectable color beam with a minimum loss of light intensity.

Figure 5:
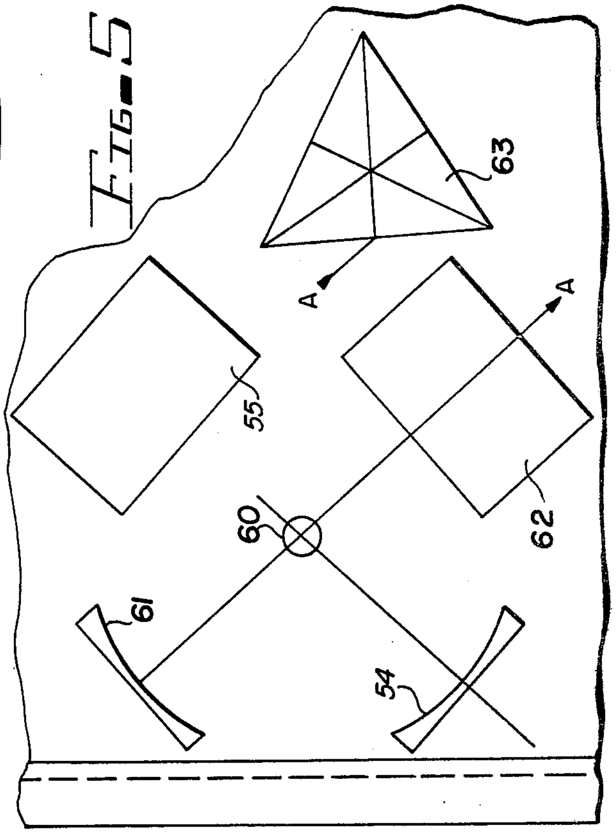
FIG. 5 is a top sectional view of an alternate embodiment of the lamp which directs two beams into separate collimating lens and prisms.

Turning now to FIG. 5, an alternate embodiment is shown in which the mercury arc lamp 60 has a concave mirror 61 mounted in accordance with FIG. 1 and has a second concave mirror 54 mounted at an appropriate angular separation from the mirror 61 generating a second beam. The mirrors 61 and 54 are mounted to focus the light on a point centered on the lamp 60. The mirror 61 directs the beam of light into a lens 62 which may be a conventional camera lens, while the mirror 54 directs the beam of light into a second identical lens 55. The lens 62 directs its beam against a prism 63 while the light from the lens 55 is directed into an identical prism so that two beams are generated simultaneously directed into a pair of lens 15 (FIG. 4) each driven by its own servo motor 22 for generating simultaneously two beams of separate or similar colors as desired.

It should be clear at this point that an apparatus for generating and projecting a bright, narrow, color selectable beam of light has been shown. It should also be clear that variations are contemplated as being within the scope of the invention, such as in varying the position of the focusing lens to generate different colors or patterns without a pattern generator. Accordingly, the present invention is not to be considered as limited to the forms shown, which are to be considered illustrative rather than restrictive.

I claim:

1. A color beam projector apparatus comprising in combination:

a light source for producing a beam of light;

a collimating lens for collimating light from said light source;

means for receiving light from said light source and dispersing the light into a plurality of spectral color components;

a movable frame supporting a focusing lens for moving said dispersed, focused light into a plurality of positions;

and a movable surface having a plurality of apertures therethrough and positioned to allow the position of any one of said apertures adjacent a focal point of the movable frame member focusing lens, thereby selecting color components of light through said aperture responsive to the position of the focusing lens and movable surface.

2. An apparatus in accordance with claim 1, in which a servo motor means moves said focusing lens.

3. An apparatus in accordance with claim 2, in which said motor means has a servo motor driving a threaded shaft connected through a threaded bore to shift the movable responsive to the rotation of the motor shaft.

4. An apparatus in accordance with claim 3, in which said frame rides on a ball slide mechanism and has said focusing lens attached thereto.

5. An apparatus in accordance with claim 4, in which said movable frame has a control shaft of a linear potentiometer attached thereto for generating feedback voltage responsive to the movement of said frame.

6. An apparatus in accordance with claim 5, in which said movable surface is a rotating surface having a ball detent mounted therebehind for selectively holding one of said plurality of apertures in a predetermined position adjacent the focal point of said focusing lens.

7. An apparatus in accordance with claim 6, in which said movable surface is a rotatable disc having a plurality of apertures of different shapes and sizes therethrough.

8. An apparatus in accordance with claim 5, in which a recollimating lens is mounted behind said surface aperture for recollimating the light passing therethrough.

9. An apparatus in accordance with claim 8, in which said recollimating lens is movable to vary the focus of said lens to achieve a small, sharp spot on nearby surfaces.

10. An apparatus in accordance with claim 8, in which said recollimated beam is directed towards a pattern generating means for generating a plurality of scanned patterns from said beam of light.

11. An apparatus in accordance with claim 10, in which said pattern generator includes a plurality of rotating mirrors, one positioned to receive said beam of light from said recollimating lens and directing the light beam to the next rotating mirror.

12. An apparatus in accordance with claim 11, in which said pattern generating means includes three rotating mirrors directing said beam of light from one to the other and therefrom onto a surface to thereby generate a pattern.

13. An apparatus in accordance with claim 1, in which a light source has a plurality of concave mirrors and a plurality of lens each directing a beam of light onto a prism and said apparatus also including a plurality of movable frames each supporting a focusing lens and each receiving a dispersed light beam from said prism, thereby generating two or more light beams of selectable colors.

14. An apparatus in accordance with claim 1, in which said light source has a concave mirror mounted adjacent thereto for directing the light from the back side of the light source to combine with the light radiating directly from the front of the light source, thereby increasing the intensity of light that can be collected by a lens of a given diameter.

* * * * *